May 12, 1964  W. F. ALTENPOHL, JR  3,132,373
POULTRY SHACKLE FOR OVERHEAD CONVEYOR AND CARRIAGE ASSEMBLY
Filed Sept. 13, 1961  12 Sheets-Sheet 1

William F. Altenpohl, Jr.
INVENTOR.

May 12, 1964   W. F. ALTENPOHL, JR   3,132,373
POULTRY SHACKLE FOR OVERHEAD CONVEYOR AND CARRIAGE ASSEMBLY
Filed Sept. 13, 1961   12 Sheets-Sheet 4

William F. Altenpohl, Jr.
INVENTOR.

May 12, 1964  W. F. ALTENPOHL, JR  3,132,373
POULTRY SHACKLE FOR OVERHEAD CONVEYOR AND CARRIAGE ASSEMBLY
Filed Sept. 13, 1961  12 Sheets-Sheet 6

William F. Altenpohl, Jr.
INVENTOR.

May 12, 1964 W. F. ALTENPOHL, JR 3,132,373
POULTRY SHACKLE FOR OVERHEAD CONVEYOR AND CARRIAGE ASSEMBLY
Filed Sept. 13, 1961 12 Sheets-Sheet 7

William F. Altenpohl, Jr.
INVENTOR.

May 12, 1964 W. F. ALTENPOHL, JR 3,132,373
POULTRY SHACKLE FOR OVERHEAD CONVEYOR AND CARRIAGE ASSEMBLY
Filed Sept. 13, 1961 12 Sheets-Sheet 8

William F. Altenpohl, Jr.
INVENTOR.

BY Clarence A. O'Brien
and Harvey B. Jackson
Attorneys

May 12, 1964 W. F. ALTENPOHL, JR 3,132,373
POULTRY SHACKLE FOR OVERHEAD CONVEYOR AND CARRIAGE ASSEMBLY
Filed Sept. 13, 1961 12 Sheets-Sheet 9

William F. Altenpohl, Jr.
INVENTOR.

May 12, 1964  W. F. ALTENPOHL, JR  3,132,373
POULTRY SHACKLE FOR OVERHEAD CONVEYOR AND CARRIAGE ASSEMBLY
Filed Sept. 13, 1961  12 Sheets-Sheet 10

William F. Altenpohl, Jr.
INVENTOR.

United States Patent Office 3,132,373
Patented May 12, 1964

1

3,132,373
POULTRY SHACKLE FOR OVERHEAD CONVEYOR AND CARRIAGE ASSEMBLY
William F. Altenpohl, Jr., Union Hill Industrial Park, West Conshohocken, Pa.
Filed Sept. 13, 1961, Ser. No. 137,815
20 Claims. (Cl. 17—44.1)

This invention comprises a novel and useful poultry shackle for overhead conveyor and carriage assemblies and more specifically pertains to a shackle particularly adapted for supporting poultry and the like during the processes of killing, dressing and eviscerating the fowl.

The primary object of this invention is to provide a poultry shackle construction for use with a carriage or hanger assembly for conveniently supporting poultry for transport by an overhead conveyor system during the performing of various operations upon poultry.

A further object of the invention is to provide a carriage assembly for supporting poultry upon an overhead conveyor system whereby the poultry may be supported in different positions by the shackle and carriage and may be thereby transported to different stations for treatment of the poultry.

Still a further object of the invention is to provide a poultry supporting construction in which a supporting carriage is provided with means for attaching the same to an overhead conveyor system for transport thereby and wherein the carriage includes a pivoted shackle which may be selectively retained in a plurality of pivoted positions together with latch means for retaining the shackle in at least one pivotal position and including means for releasing the latch means in order that the shackle and article carried thereby may assume a different pivoted position with respect to the carriage.

A further object of the invention is to provide a carriage having a poultry supporting shackle that is easy to load or unload, which will support the poultry carried thereby in a three-point suspension, which shall be capable of being titled forward by slight pressure whereby to drop the poultry from the shackle.

Another object is to provide a poultry supporting hanger for overhead conveyor systems having improved means to facilitate and render more accurate the weighing of the poultry during their transportation.

A still further important object of the invention is to provide an improved poultry shackle in accordance with the preceding objects which will secure a firm gripping engagement upon the legs of the poultry to securely hold and carry the same and wherein the weight of the poultry will serve to even more securely retain the legs in the shackle together with means facilitating the release of the poultry from the shackle when desired.

Yet another important object of the invention is to provide a series of shackle constructions each of which is specifically adapted to support the poultry in a manner enabling a specified operation to be performed thereon, such as shackles especially adapted to support poultry during their progress along an overhead conveyor system of a poultry killing line; to support the poultry during cleaning, plucking and dressing operations thereon; to support the poultry in a convenient manner for evisceration and for inspection of the finished poultry.

An additional object of the invention is to provide shackle constructions in accordance with the foregoing objects which shall be readily fabricated from rod-like material and shall avoid insofar as possible the formation of corners or sharp or recessed surfaces in order to facilitate sanitation and the sterilizing of the shackles.

Yet another additional object of the invention is to provide a shackle construction which shall be of extremely lightweight, very compact in size to thereby facilitate storage as well as use of the shackles, and shall be of sturdy long wearing construction and easily manipulated for securing poultry therein or releasing poultry therefrom.

These together with other objects and advantages which will become subsequently apparent reside in the details of construction and operation as more fully hereinafter described and claimed, reference being had to the accompanying drawings forming a part hereof, where in like numerals refer to like parts throughout, and in which:

FIGURES 5-9 are elevational views showing somewhat diagrammatically the carriage and shackle supporting poultry during various steps of treating the same in the assembly line process of FIGURE 1 for dressing and eviscerating poultry;

FIGURES 13-23 disclose a modified construction of shackle from that shown in FIGURES 1-12, in which:

Figure 1:
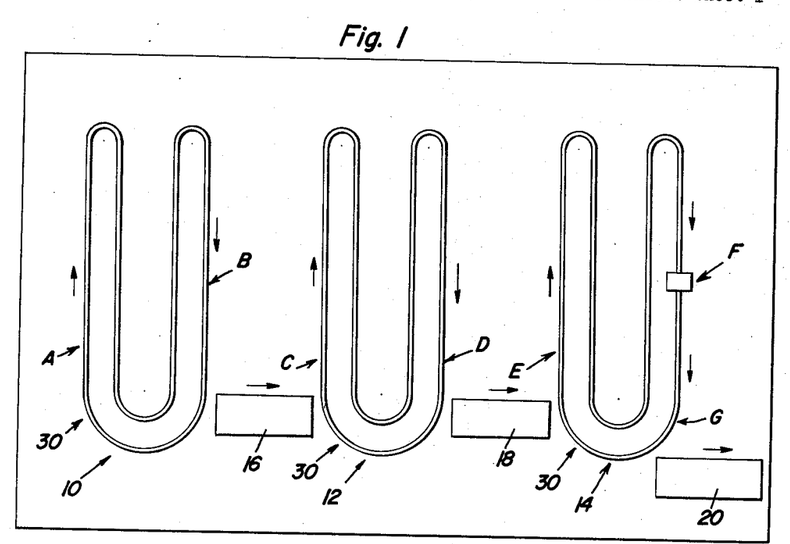
FIGURE 1 is a somewhat diagrammatic view showing in plan a typical overhead conveyor system adapted for the handling of poultry for the dressing and eviscerating of the same and to which the improved shackle construction of this invention is particularly applicable.

Reference is made first to the somewhat diagrammatic view of FIGURE 1 which shows in plan a typical conveyor line installation of the overhead conveyor type adapted for the handling of poultry for the purpose of performing such operations as plucking, dressing and eviscerating the same and to which and for which the novel and improved carrier and shackle constructions of this invention are specifically adapted. Although by no means limited thereto, the poultry handling system of the present invention consists of three generally U-shaped endless conveyor systems shown at 10, 12 and 14 respectively and which are disposed in side by side relation together with a pair of intermediate collection stations 16 and 18 together with an end station 20. As will be observed, each of the endless overhead conveyor systems 10, 12 or 14 consists of a single endless conveyor chain as at 30 and which chain is trained over suitable supporting and driving elements and various support and guide means whose constructions in themselves form no part of the present invention, but by means of which the chain is disposed in U-shaped configuration with a pair of legs together with an arcuate web portion adjoining the legs, and with the chain moving along both the inside and outside edges of the legs and the web as shown.

During the travel of the poultry carried by the conveyor chains 30, various operations are performed in succession thereon so that freshly butchered poultry starting at a convenient position upon the conveyor chain 30 of the conveyor assembly 10 may have a certain series of operations performed thereon, after which the poultry is dropped to the collection station 16, is then placed upon the second conveyor chain 30 of the conveyor assembly 12, has other operations performed thereon, is then discharged at the station 18 and finally is again carried by the conveyor chain 30 of the conveyor assembly 14 for the completing operations, after which the completely plucked, cleaned and eviscerated poultry is dropped at the collection station 20 and is then removed for packaging or other purposes.

Reference is now made more specifically to FIGURES 2–4 and 12 for an illustration of and an understanding of a suitable construction of the carrier and shackle which forms an important feature of the present invention and by which poultry are secured to and supported by the endless conveyors 30 of the conveyor assemblies and while so supported are transported to various stations to have various operations performed thereon. The shackle designated generally by the numeral 40 consists of a vertically elongated rod-like body or shank 42 which has a bifurcated upper extremity 44 provided with a pivot pin 46 by means of which the depending tongue 48 of a rod-like support member 50 of a carrier or hanger is pivotally attached. At the opposite end of the support 50 a bifurcated extremity 52 by means of a pivot pin 54 pivotally secures a link 56 whose other extremity is apertured as at 58.

Figure 5:
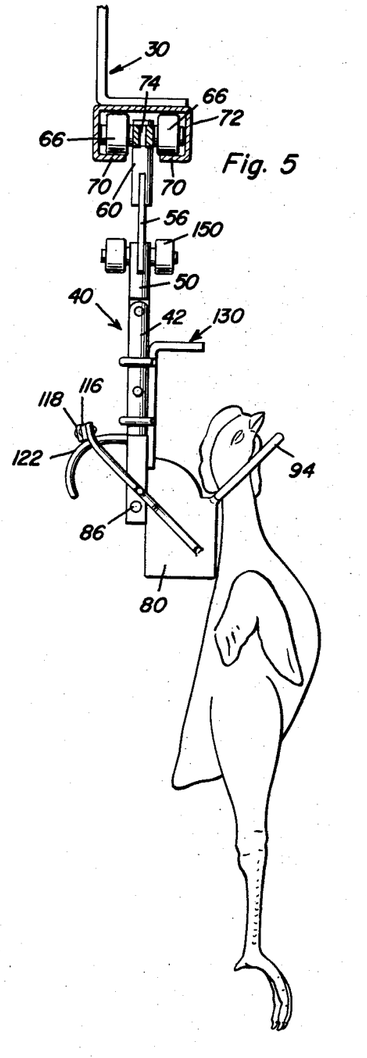
FIGURE 5 is a view in elevation showing the position of the parts when a chicken is hung from the shackle adjacent the initial loading station of the conveyor system as at the station A.
Figure 6:
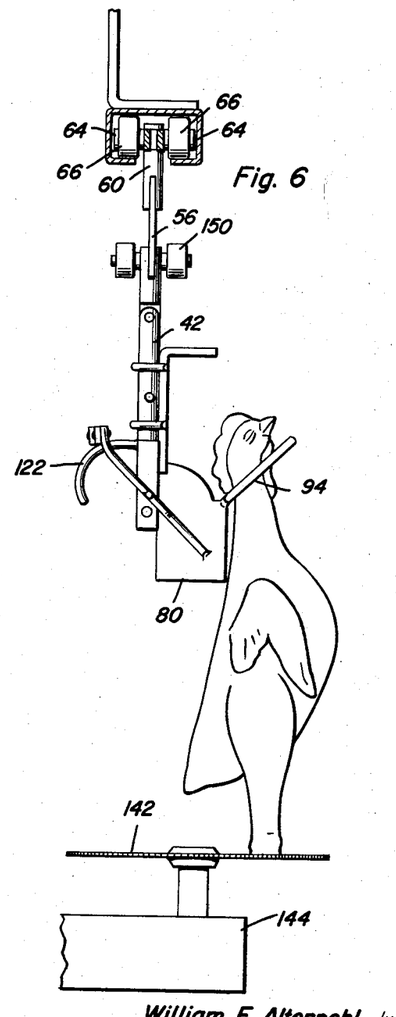
FIGURE 6 is a view similar to FIGURE 5 but showing the chicken's legs being severed as at the station B.
Figures 7, 8, 9:
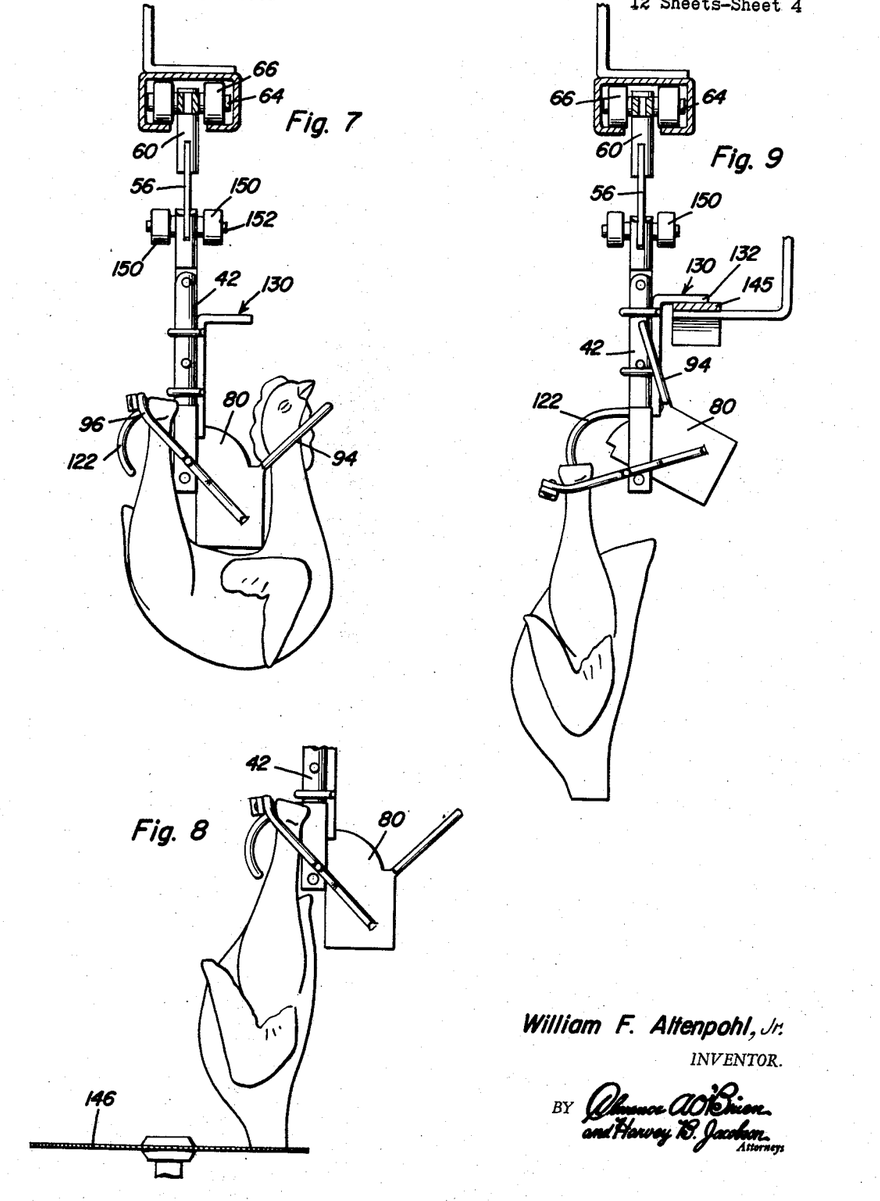
FIGURE 7 is a further view similar to FIGURE 5 but showing the chicken after the severing of the legs and secured to the shackle in a three-point suspension as at the station C.
FIGURE 8 is a view similar to FIGURE 5 but showing the head of the fowl released from the shackle and severed prior to reaching the station D.
FIGURE 9 shows the beheaded fowl being released from the shackle as at station D.
Figures 10, 11:
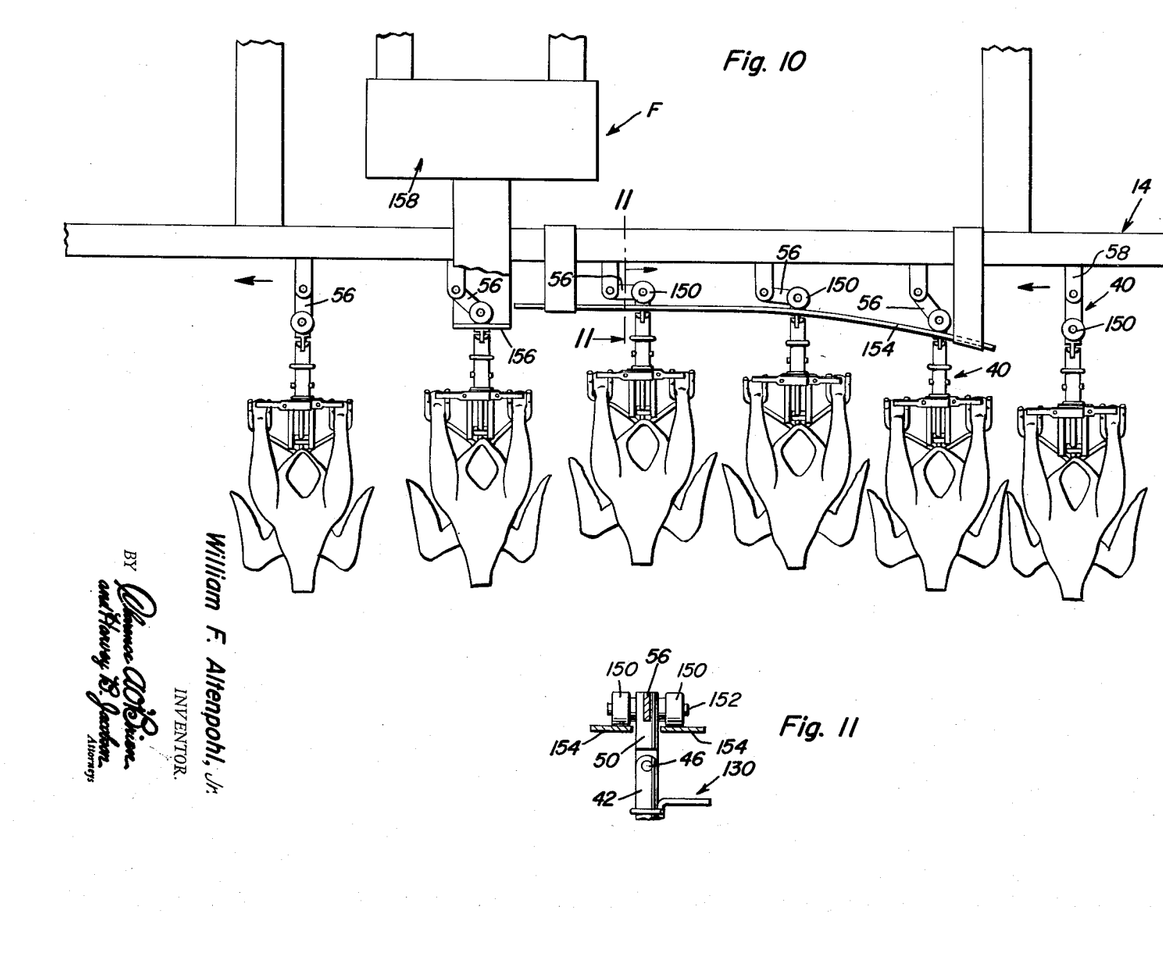
FIGURE 10 is an elevational view showing a portion of the overhead conveyor system, carriages, shackles and poultry supported thereby as the same pass through a weighing station.
FIGURE 11 is a detailed view taken upon an enlarged scale in vertical transverse section substantially upon the plane indicated by section line 11—11 of FIGURE 10.
Figure 12:
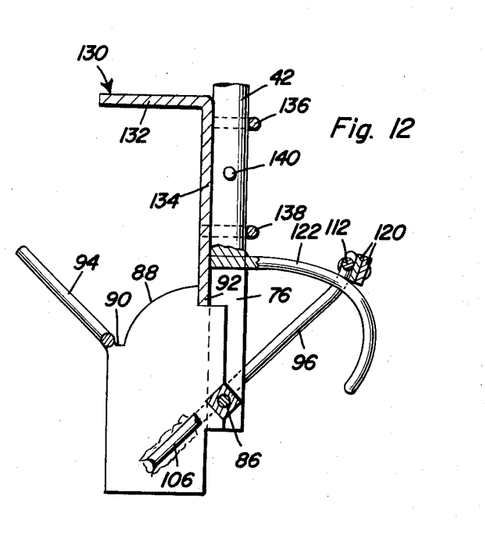
FIGURE 12 is a further detail view taken in vertical section substantially upon the plane indicated by section line 12—12 of FIGURE 3 and showing details of the latch actuating means of the shackle of FIGURES 1-11.

Referring now to FIGURES 5–7, it will be understood that the link 56 is pivotally secured in a bifurcated lower end of a body 60, see also FIGURE 11, by means of a suitable pivot pin, which body 60 in turn has a transversely extending axle or trunnion 64 provided with support rollers 66 thereon. As observed from FIGURES 5–7 and 9 it will be understood that the body 60 is free to swing or pivot about the axis upon which the rollers 66 are journalled so that as these rollers travel along support flanges 70 which are disposed in spaced relation to each other and form part of a conveyor assembly supporting frame 72, the shackle 40 can freely pivot in various directions as necessitated by its travel and the subsequent handling operations to which it is subjected.

It will be understood that a plurality of the carriers and their shackles 40 have their support bodies 60 each connected to a conveyor chain, not shown, but a portion of which is indicated by the numeral 74 so that the carriers are maintained in spaced relation with respect to each other and are drawn along the desired path of travel in accordance with the movement of the conveyor chain. Inasmuch as the adjacent edges of the flanges 70 are spaced from each other to provide a slot therebetween, ample clearance is provided for the depending of the body 60 therebeneath despite the various pivoting actions to which the different portions of the carrier assembly are subjected during the operation of the device.

Referring again more specifically to FIGURES 2-4 it will be observed that the lower end of the shank or body 42 of the shackle is provided with a downwardly opening depending U-shaped fork 76 having parallel legs together with a connecting web 78 across the upper ends of these legs and joining the latter to the lower end of the shank 42.

Figures 2, 4:
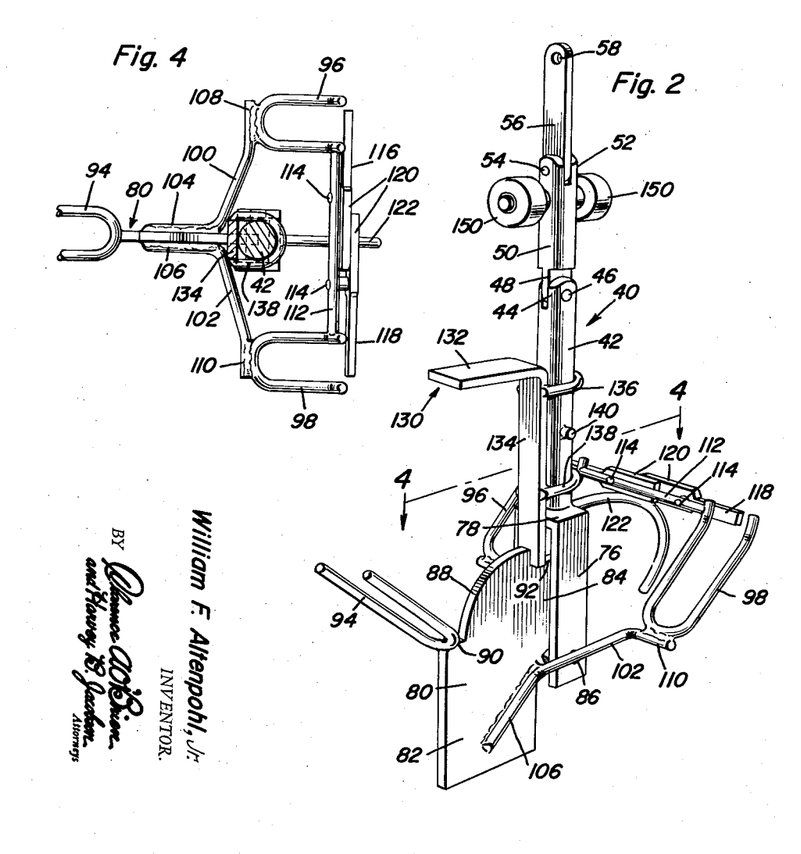
FIGURE 2 is a perspective view of one form of carriage and shackle of the present invention as removed from the overhead conveyor system and showing the poultry retaining shackle of the carriage latched in one pivotal position thereon.
FIGURE 4 is a horizontal sectional view taken substantially upon the plane indicated by section line 4—4 of FIGURE 2.

An important component of the shackle 40 is the support plate 80 which is a flat plate-like body generally L-shaped in configuration with a vertical lower portion 82 and a horizontally extending laterally projecting upper portion 84. The upper portion 84 is slidably received between the legs of the yoke 76 and is pivotally mounted therebetween as by the pivot pin 86 adjacent the lower end of the yoke and of the upper portion 84 so that the vertical leg 82 will lie outside of the yoke 76 as shown in FIGURE 2 and as further shown in the operational views of FIGURES 5-9.

It will be observed that the top surface of the support plate 80 is provided with a curved convex edge 88 which terminates in shoulders 90 and 92 at its opposite extremities. The shoulder 92 constitutes a latch recess or part of a locking means as set forth hereinafter, while the shoulder 90 is utilized to receive thereon the web or mid-portion of a U-shaped hook 94 which is welded thereto. As will be observed from FIGURE 2 this hook extends upwardly and outwardly from the lower portion 82 of the support plate 80 and serves a function to be hereinafter set forth. The opposite side of the shackle from that containing the U-shaped hook 94 is provided with a cooperating pair of generally parallel U-shaped hooks as shown at 96 and 98. These last mentioned hooks are each carried by a pair of parallel support rods 100 and 102 which extend outwardly from opposite sides of the support plate as shown in FIGURE 4 and are welded or otherwise rigidly secured to the support plate by end portions 104 and 106 respectively. At their outer extremities, the support rods 100 and 102 have end portions 108 and 110 to which the mid-portions of webs of the U-shaped hooks 96 and 98 are welded so that these last mentioned hooks are disposed in parallel relation.

It will thus be observed that the three U-shaped hooks 94, 96 and 98 are directed upwardly and outwardly with respect to the lower end of a shank 42 and constitute a three-point support for a purpose to be subsequently set forth.

The structure thus described constitutes pocket means with each of the hooks comprising a pocket having an outer open end defining an exit or inlet for the pocket.

As shown more clearly in FIGURE 4, a reinforcing brace or cross rod 112 has its extremity welded to the adjacent legs of the U-shaped brackets 96 and 98 to rigidify the assembly thereof while leaving the open ends of the U-shaped hooks unobstructed. The rod 112 serves not only to rigidify the hooks but also serves as a support means and carries by means of a pair of pivots 114 a pair of closures for the U-shaped hooks 96 and 98. These closures consist of levers 116 and 118 whose outer ends are adapted to pass across and thus obstruct and close the open ends of the hooks 96 and 98 when in the position shown in FIGURES 2 and 4, or in full lines in FIGURE 3, and upon pivoting of these closure levers uncover these open ends as shown in dotted lines in FIGURE 3.

The adjacent inner ends of the closure levers are provided with overlapping thickened plate-like terminal portions each indicated by the numeral 120 and which constitutes the actuators for the levers. These terminal portions are adapted to ride upon an appropriately shaped curved rod 122 which thus constitutes a closure cam and which is welded to the shank 42 or the yoke web 78 and projects laterally therefrom as will be apparent from a comparison of FIGURES 2, 3 and 4.

As so far described it will be understood that the support plate 80 thus has three spaced upwardly inclined U-shaped hooks upon which the neck and legs of a fowl may be supported, as for example, as shown in FIGURE 7, and that this support plate is pivotally carried by the fork 76 for tilting movement relative thereto. This tilting movement will be effective either by the center of gravity of the poultry carried by the shackle or by manual or automatic means acting upon the support plate for this purpose. In order to retain the support plate in a predetermined position of tilted adjustment, there is provided a latch means cooperating with the latch shoulder 92 previously mentioned. This latch means consists of an L-shaped bracket indicated generally by the numeral 130, having a horizontal arm 132 and a vertical arm 134. The lower end of this vertical arm is adapted to slide against the adjacent vertical surface of the web 78 of the fork 76, and to engage in the latch recess or with the latch shoulder 92 as previously mentioned and as shown in FIGURE 2. The horizontal arm 134 is mounted up the shank 42 for guided sliding movement axially thereof by means of a pair of guide rods 136 and 138 in the form of loops or brackets and which slidingly embrace the shank 42. A pair of transversely laterally projecting stop pins 140 on the shank cooperate with the guide rods 136 and 138 to limit axial sliding movement of the latch bracket.

It will be observed that when the latch is in its lowered position engaged in the latch recess 92, clockwise pivoting of the support plate is prevented completely. However, when the latch is raised, the support plate is free to pivot clockwise either by the positioning of the center of gravity of the poultry carried by the device or by manual or automatic means as previously suggested.

It will now be observed that the top surface of the closure cam 122 is so contoured that the actuators or terminal portions 120 of the closure levers 116 and 118 will ride upon the top surface of the same and retain the closure levers in a transverse position in which they project across and close the openings of the U-shaped hooks 96 and 98. However, when the support plate 80 together with the hooks 96, 98 and the closure levers rotate in a clockwise direction about the pivot 86, the cam contour is such that a pivoting of the levers and their actuators 120 will be permitted so that the levers are free to open or uncover the ends of the hooks as shown in dotted lines in FIGURE 3. Thus, in a clockwise tilted position of the plate 80, the weight of the poultry carried by the hooks 96 and 98 will be free to open the closure levers and thus disengage the poultry from the hooks and thus drop that portion of the poultry from the device.

From the foregoing it will be observed that there has been provided a poultry carrier and shackle assembly which is particularly adapted for use with overhead types of conveyor assemblies in which the poultry is hung in a depending relation therefrom, and which will permit swinging of the poultry or tilting of the same with its shackle and carrier through a considerable latitude of movement throughout 360° of the horizontal plane. In addition, the center of gravity of the poultry upon its carrier and shackle may be such as to produce a permanent bias or tendency to rotate the carrier plate 80 in a clockwise direction. This however will be restrained temporarily by the latch means 130 so that when the latch means is disengaged this weight will serve to rotate the support plate 80, release the closure levers and permit the poultry to disengage itself from the hooks 96 and 98. Obviously, tilting of the carrier plate in the other direction, either before or after the closure levers have been released, will permit the poultry to disengage from the other hook 94. Thus, release of the poultry from the hook is automatically effected, either in whole or in part by merely tilting either manually or automatically the support plate 82 in either clockwise or counterclockwise direction; and/or by disengaging the latch means as previously mentioned.

In order to illustrate more clearly and completely the functioning of this carrier and shackle and a method of handling poultry, reference is now made more particularly to FIGURES 1, 5–10. With the carrier support plate 80 in its normally latched position as shown in FIGURE 5, a chicken is hung by the neck in the U-shaped hook 94. At this time, since the center of gravity of the chicken lies to the right of the support plate pivot pin 86 as viewed in FIGURE 5, there would be a tendency of the support plate to rotate in a clockwise direction, which, however, is resisted by engagement of the closure levers 116, 118 upon the closure cam 122 whose contour is such as to prevent this clockwise rotation. At this time, the shackle 40 with the chicken mounted thereon may be considered at the position indicated at A in FIGURE 1. The poultry then moves in a direction indicated by the arrow upon the carrier or conveyor 30, during which time the feathers are plucked from the poultry by conventional equipment in a desired manner.

As the shackle 40 moves from the station A towards the station B the plucking of the poultry is completed. At station B, as shown in FIGURE 6, the depending legs of the poultry are severed as they pass the rotary knife 142 powered by a motor 144. Thereafter the chicken is released from the shackle into the collector 16. This release is effected by manually or otherwise pulling the neck of the chicken from the open end of the hook 94.

Next the fowl is applied to the shackle 40 of the conveyor 12 at the station C, the neck being engaged in the hook 94 and the legs in the hooks 96 and 98 as shown in FIGURE 7. In this position the fowl travels to the station D, during which travel the fowl is eviscerated in the usual manner. At the station D, the depending head of the poultry is severed by the power driven rotary knife 146 as shown in FIGURE 8. Prior to reaching the station D, but after the eviscerating operation is completed, the poultry neck is disengaged from the hook 94 and the latch 130 is then automatically released as by engagement of the latch arm 132 with a stationary latch actuating cam 145 and the plate 80 then pivots by gravity counterclockwise as shown in FIGURE 9. The beheaded poultry is then discharged into the collector 18.

At the station E, the poultry is again loaded upon a shackle 40 of the conveyor 14, hanging by its legs from the hooks 96, 98 as shown in FIGURE 10. When the laden shackles successively reach the station F they are weighed in a manner and by a means to be now set forth.

Figure 3:
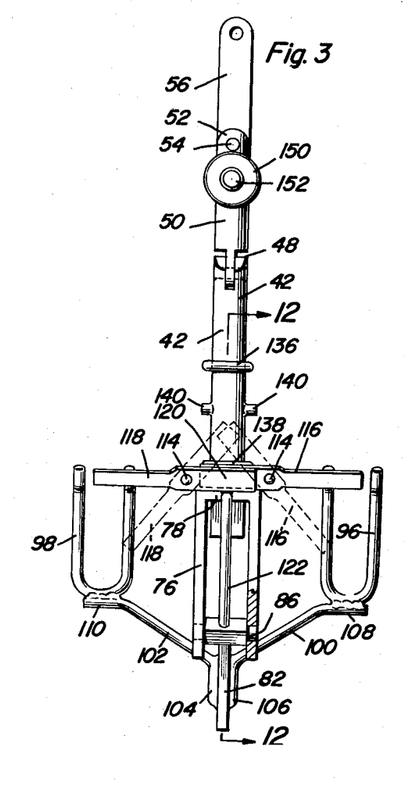
FIGURE 3 is an end elevational view of the carriage and shackle of FIGURE 2 taken on the right side thereof.

Referring now to FIGURES 2 and 3 in conjunction with FIGURES 10 and 11, it will be seen that the previously mentioned support member 50 is provided with support rollers 150 on a transverse axle or trunnions 152. As the support member 50 pivotally hangs from the conveyor chain or support body 60, these rollers 152 ride up upon a pair of parallel upwardly inclined tracks 154 with the support member 50 sliding therebetween. The tracks 154 are suitably supported from and are disposed slightly below the conveyor frame 72 as shown in FIGURE 10.

The arrangement is such that travel of the conveyor causes the support rollers 150 to ride up the tracks 154 thereby relieving the conveyor chain of the entire weight of the shackle 40 and the fowl carried thereby, this condition occurring as the link 56 tilts from a vertical load supporting position at the right of FIGURE 10 into a horizontal load relieved position at the middle of FIGURE 10, see FIGURE 11. In this latter position the conveyor chain and the link 56 are subjected only to the load required for horizontally moving the support body 50 along the tracks 154, which latter now support the entire weight of the shackle and fowl.

Arriving at the station F, the rollers 150 of the support body pass into the weighing platform 156 and an instantaneous weighing is obtained by the weighing mechanism indicated generally by the numeral 158. After the weighing operation the poultry is unloaded from the shackle 40 at the discharge station G and is received in the collector 20 for suitable disposition.

It will be noted that the carrier and shackles of this invention allow complete freedom of swiveling or turning of the shackle and the fowl supported thereby throughout the travel of the conveyor. Further, it permits successive tiltings of the support plate 80 to permit releasing of the fowl from either end of the shackle. Further it prevents accidental tilting of the carrier plate and release of the fowl from the hooks 96, 98, due to the functioning of the closure cam 122 and the closure levers 116, 118.

Further, the weighing operation is rendered more accurate by lifting the carrier shackle and poultry weight from the conveyor during weighing.

A modified construction of shackle which is specifically adapted for use during the process of eviscerating chickens or poultry during their transportation by an overhead conveyor system of the type previously described is illustrated in FIGURES 13–23. The improved form of shackle shown in these figures is designated generally by the numeral 160 and includes an upwardly projecting shank 162 whose bifurcated upper end is secured to the carrier or carriage support member 50 previously mentioned. The shackle in this form of the invention includes a stationary outer component in the form of a generally rectangular frame together with a centrally disposed movable component slidably received therein. The outer component includes a plate-like top member 164 which extends horizontally and to the mid-portion of which is welded or otherwise fixedly secured the vertically disposed shank 162 in the positions of the shackle as shown in FIGURES 13–23 which is the normal position during operation. Depending from the opposite sides of the top plate 164 and welded or otherwise fixedly secured thereto is the U-shaped, rod-like element which completes the stationary frame. This element includes side legs having parallel upper portions 166 together with inwardly offset but parallel lower portions 168, the latter being integrally joined by a bottom web or cross member 170. Secured to the underside of the top member 164 and in vertical alignment with the shank 162 is a downwardly depending standard 172 which is slotted to provide and constitute a guide means. This standard may consist of a pair of parallel rods or may comprise a single bar or strap which is longitudinally slotted. Depending from the cross member 164 and on opposite sides of the standard 172 are pairs of apertured lugs or fulcrums 174 to which are pivotally secured locking jaws 176.

Each locking jaw is of U-shaped configuration consisting of an upper horizontally and laterally extending portion comprising a support arm 178 which is pivotally received between and connected to the lugs 174, together with a vertically extending lower arm 180 which latter is adapted to embracingly receive the upper portion 166 of the frame. The arrangement is such that gravity will urge the locking jaw 176, its support arm 178 and its lower arm 180 into the position shown in FIGURE 13 at which time the web of the U-shaped arm will abut against the upper portion 166 of the stationary outer frame. However, the arm may be pivoted as set forth hereinafter to the dotted line position shown in FIGURE 14, in a direction to move the portion 180 away from the frame portions 166. A spring means indicated in dotted lines at 182 in FIGURE 14, is conveniently utilized to engage in a suitable manner the arm portion 178 of the jaw and the underside of the cross member 164 to yieldingly urge the jaws into their full line position shown in FIGURES 13 and 14.

At their lower ends, each of the jaws is provided with a laterally inwardly projecting portion 184 which projects inwardly of the stationary outer frame when the jaws are in their full line position. This portion has a downwardly and inwardly inclined top cam surface 186 thereon so that when the leg of a chicken is pressed downwardly from the surface, the jaws will be swung outwardly against their return spring to permit the leg of the chicken to move downwardly into the lower portion of the elements 168 of the outer frame. Cooperating with the outer frame is a movable component.

Secured to the lower end of the guide member or standard 172 is a transversely extending pair of crossbars 190 which serve as a stop for the guide slot within the standard 172 and also serves as a support for movable jaw elements and to support a movable hook as set forth hereinafter.

Projecting laterally from one of these crossbars is a pair of apertured lugs 192 in which are pivotally secured the out-turned end portions 194 of the upper ends of a pair of downwardly convergent legs 196. The latter are integrally connected to the lower end by a loop 198 and thus provide a V-shaped hook which is swivelled to the cross member 190 and which may be utilized to receive the neck of a fowl.

A pair of L-shaped or bell crank members designated generally by the numeral 200 cooperate with the rod portion 168 to provide V-shaped recesses for receiving and retaining the legs of poultry therein. Each of the levers 200 which constitutes a movable jaw is pivoted at 202 to the end portions between and at one end of a pair of crossbars 190 with two levers being disposed at opposite ends of the bars.

Each lever includes a laterally projecting horizontal top portion 204 together with a depending lower portion 206. The levers are disposed or journalled on opposite sides of the standard 172 as will be best apparent from a consideration of FIGURES 13-15. The lower ends of each of the jaws 200 is bifurcated to provide a yoke 208 which is slidably and loosely guided upon the lower stationary frame member 170 as will be apparent from a consideration of FIGURES 13 and 14.

The top surface of each of the horizontal portions 204 is cutaway as at 210 to provide a vertical or locking shoulder 212. It will be observed that this locking shoulder lies inwardly or between the pair of pivots of the two movable pivoting jaws 200, and the locking surfaces of the two jaws face in opposite directions or towards each other.

Figure 13:
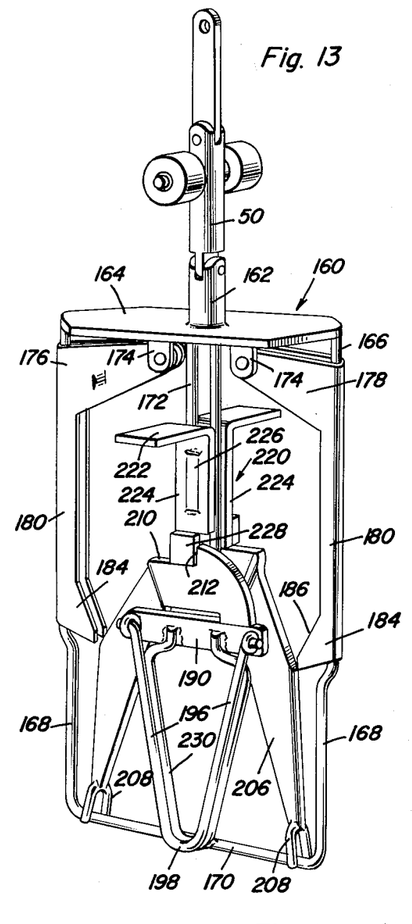
FIGURE 13 is a perspective view of the modified shackle construction specifically intended for use in supporting poultry for evisceration as they are conveyed by an overhead conveyor in an eviscerating line or process.
Figure 14:
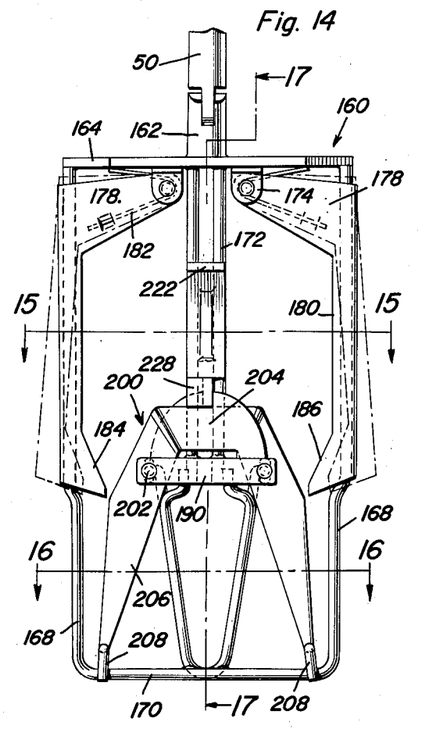
FIGURE 14 is a view in elevation of the shackle of FIGURE 13, alternative positions of the spring urged locking jaws of the shackle being shown in full and dotted lines therein.
Figure 15:
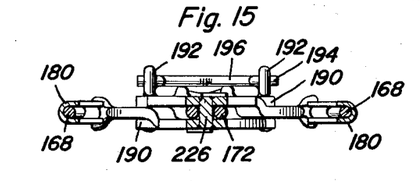
FIGURES 15 and 16 are horizontal sectional views taken substantially upon the planes indicated by section lines 15—15 and 16—16 respectively of FIGURE 14.
Figure 16:
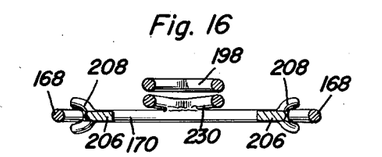

A sliding latch is provided cooperating with the locking surface 212 of the two pivoted locking jaws 200 to retain the jaws in their locking position which is the position shown in FIGURES 13 and 14. This latch or locking means consists of a slide body 220 having laterally directed flanges 222 at its upper end to provide fingergrip means whereby the latch member may be manually raised or lowered. Conveniently, the latch member may consist of a pair of L-shaped bracket-like members consisting of a horizontal upper portion and a vertical, depending lower portion 224. The two lower portions 224 originally connected by a transversely extending bar or plate member 226 disposed between and secured thereto, which plate member slides in the slot provided by the standard 172. In this manner, the latch member 220 may move in guided relation vertically upon the standard 172. At its lower end the latch member includes a laterally projecting locking bar 228 which is adapted to engage in the recess 210 and cooperate with the locking shoulder 212 to prevent pivoting movement of the movable jaw members 200.

Rigidity of the crossbars 190 with respect to the outer frame member may be obtained by suitable bracing such as the V-shaped bracing member 230 which may be welded to the lower cross bar of the frame 170 and the crossbars 180.

Figures 19, 20, 21:
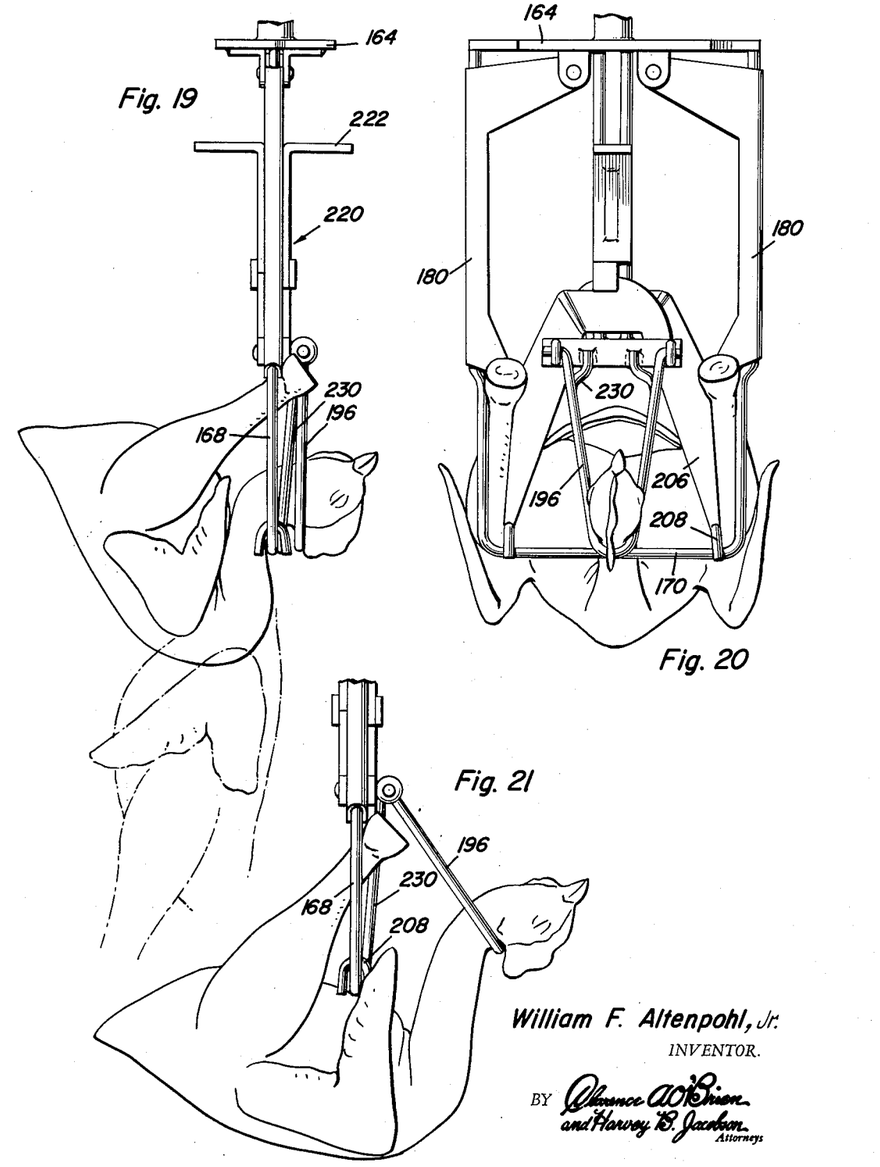
FIGURE 19 is an elevational view indicating in full lines the manner in which the legs and neck of poultry are secured by the eviscerating shackle of this form of the invention, and showing in dotted lines the manner in which the neck is held after the shackle is actuated to release the feet of the poultry therefrom.
FIGURE 20 is an elevational view taken at right angles to and from the right of FIGURE 19 and showing the poultry supported by both its legs and neck in the shackles.
FIGURE 21 is a side elevational view similar to FIGURE 19.
Figure 24:
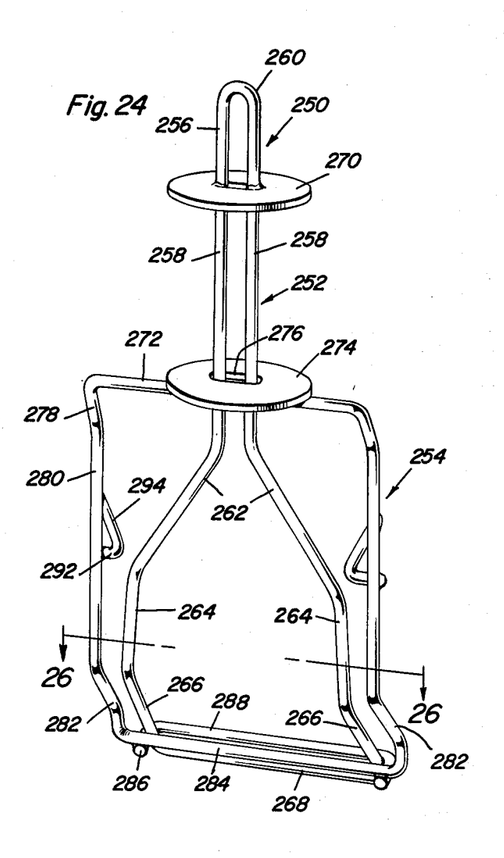
FIGURE 24 is a perspective view of a further modified shackle construction specifically adapted as a shackle for supporting live poultry in preparation for killing the poultry in an overhead conveyor system.
Figure 25:
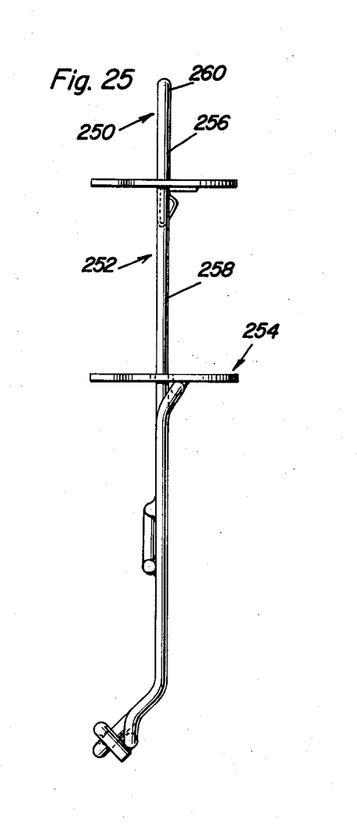
FIGURE 25 is an end elevational view of FIGURE 24 from the left side thereof.
Figure 26:
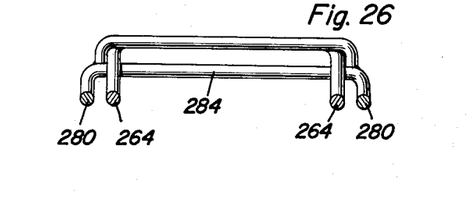
FIGURE 26 is a horizontal sectional view taken substantially upon a plane indicated by section line 26—26 of FIGURE 24.
Figure 27:
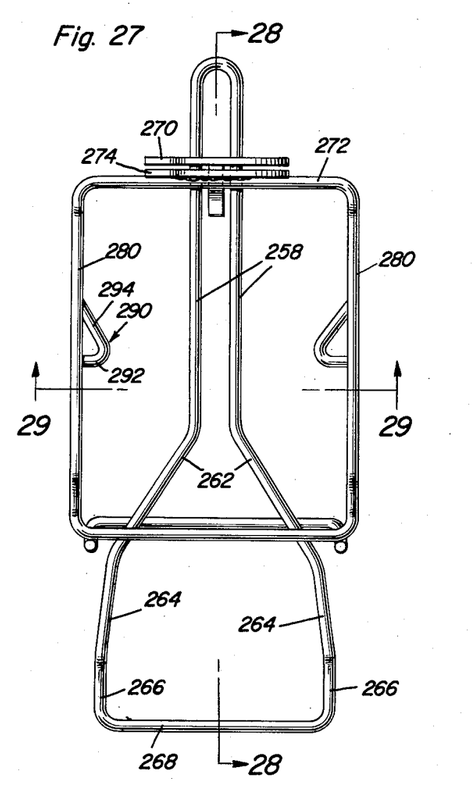
FIGURE 27 is a view similar to FIGURE 24 but showing the shackle in a poultry releasing position.
Figure 28:
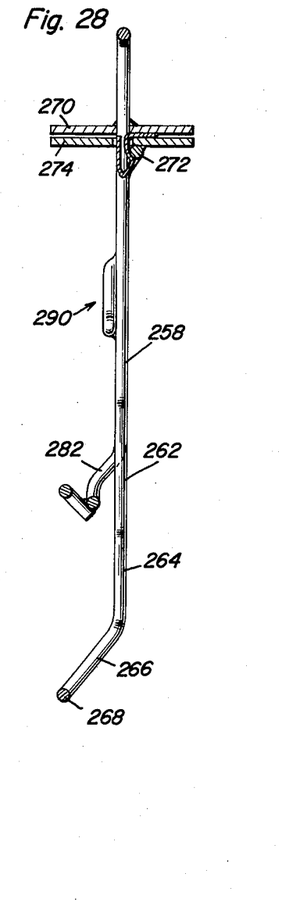
FIGURE 28 is a vertical central longitudinal sectional view of the shackle of FIGURE 27 being substantially upon the plane indicated by section line 28—28 of FIGURE 27.
Figure 29:
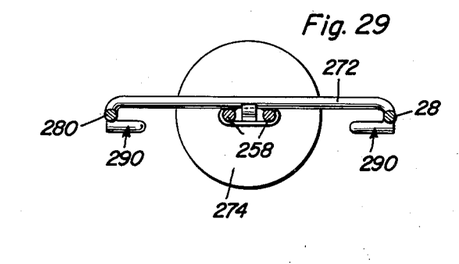
FIGURE 29 is a horizontal sectional view taken substantially upon the plane indicated by section line 29—29 of FIGURE 27.

The operation of this form of the invention is as follows: The legs of a chicken may be thrust downwardly upon the cam surfaces 186 thereby causing the jaw members 176 to pivot outwardly against the resistance of their return springs 182 into the dotted line position shown in FIGURE 14, thereby permitting the legs of the chicken to slide downwardly between the frame portions 168 and the adjacent surfaces of the pivoted jaws 200, the latter being understood to be locked in the position shown in FIGURES 13 and 14 by engagement of the locking bar 228 with the locking shoulders 212. In this position, the legs of the chicken are wedged into the wedge-shaped space between the members 168 and 206 and below the laterally inwardly directed portion 184 of the jaws 176. The weight of the chicken and any movements of its legs will further tend to increase the wedging action and thus more securely retain the legs of the chicken in the shackle. The chicken may thus be hung from its legs in the shackle with its head hanging downward for some operations, or alternatively its head may be disposed in and hung within either or both of the members 196 or 230. The hanging of the chicken downwardly by its legs is shown in dotted line in FIGURE 19, while the disposition of the neck of the chicken through both of the V-shaped hook members is shown in FIGURE 19 or through the pivoted hook member 196 is shown in FIGURES 20 and 21. Thus the chicken may selectively be hung downwardly by its legs or may be supported by both its legs and neck so that the body of the chicken is substantially horizontal to facilitate the performing of certain operations upon the fowl.

Figures 17, 18, 22, 23:
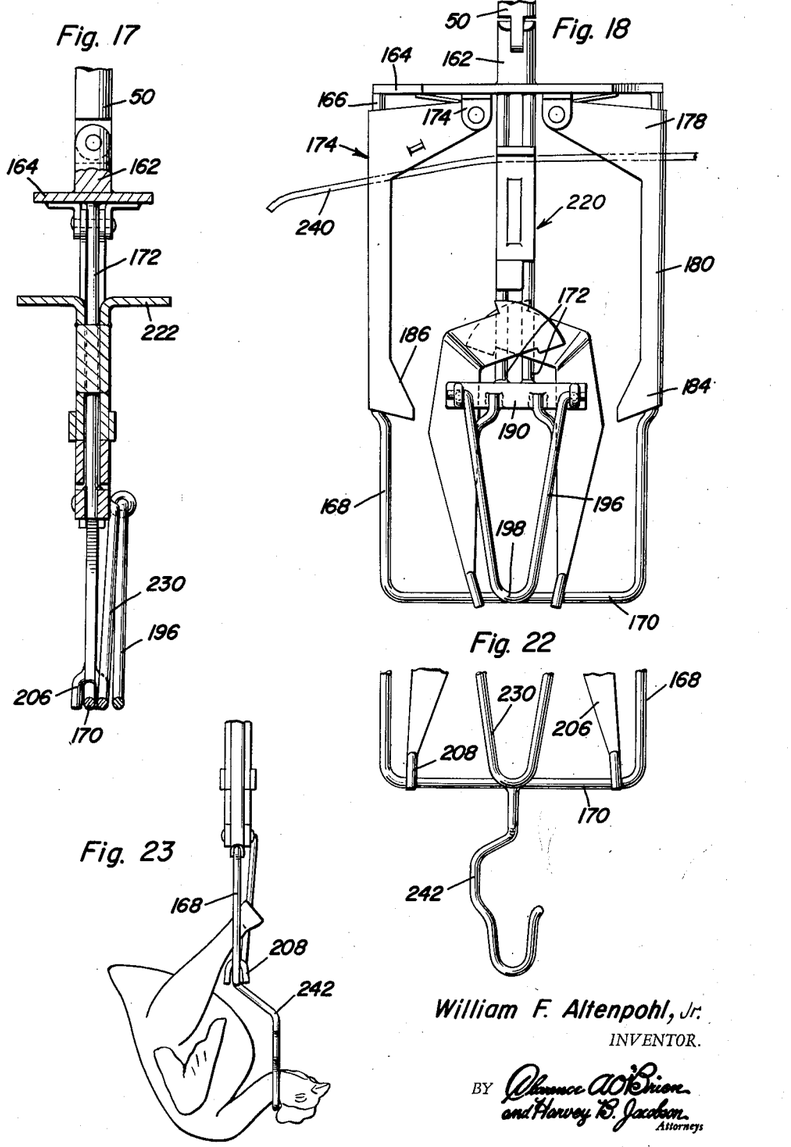
FIGURE 17 is a vertical longitudinal sectional view taken substantially upon the plane indicated by broken section line 17—17 of FIGURE 14.
FIGURE 18 is an elevational view similar to FIGURE 14 but indicating the manner in which the shackle is automatically actuated to release the poultry held thereby by an actuating element of the overhead conveyor system located at a poultry releasing station.
FIGURE 22 is a detailed view showing in elevation the lower portion of the shackle of FIGURES 13, 14 and 18 but showing a modification in which an integral hook is provided depending from the shackle for securing the neck of poultry therein.
FIGURE 23 is a detailed view taken at right angles to FIGURE 22 and showing the manner in which the legs and neck of poultry are secured in the shackle construction of FIGURE 22.

When it is desired to disengage the head of the chicken from the retaining hooks, this may be done manually in any suitable manner as desired. In order to release the legs to permit the entire fowl to be withdrawn from the shackle, it is merely necessary to lift the latch member 220 by sliding the same upwardly along its guide standard 172. This result may be effected by grasping both the cross plate 164 and the fingergrip flange 222 of the latch and moving the same together manually, or alternatively this lifting movement can be effected automatically by properly positioning a cam rail 240 in such a position that it is shown in FIGURE 18, this rail will be engaged by the underside of the latch actuating flanges 222 and thus elevate the latch as the shackle passes by the rail. The lifting of the latch will withdraw the lock bar 228 from engagement with the stop shoulders 212 of the pivoted movable jaws 200, thereby enabling the latter to swing inwardly toward each other to the position shown in FIGURE 18. This will widen the V-shaped recess in which the legs of the chicken are received and enable the legs to be readily withdrawn under the weight of the chicken.

A slightly modified arrangement is provided as shown in FIGURES 22 and 23 for supporting the neck of the chicken. As shown in FIGURE 22, depending from the brace member 230 is an integral hook 242, which thus will support and retain the neck of the chicken at a lower position than is possible with the previously described swinging hook 196, 198.

FIGURE 23 discloses the configuration of this hook and the manner in which it assists in supporting a chicken in a shackle.

Reference is now made to FIGURES 24-29 which shows a considerably simplified version of shackle which is specifically adapted for supporting chickens in preparation for killing the same. This form of shackle, designated generally by the numeral 250 consists of two relatively movable components, these comprising a relatively stationary inner component indicated generally by the numeral 252 and a relatively movable outer component designated generally at 254. Each of these components is rod-like or wire like in character consisting of a single rod-like element appropriately shaped and formed.

The stationary inner component 252 which also constitutes the means for supporting the shackle from the carriage or carrier member of the conveyor chain system has an upwardly projecting stem 256, the latter comprising a pair of parallel rod portions 258 joined at their upper end by integral loop or web 260. At their lower ends the portions 258 have outwardly and downwardly divergent portions 262 which at their lower ends are again angulated to provide downwardly and outwardly divergent portions 264 forming a lesser included angle than that of the portions 262. These last mentioned portions 264 at their lower ends are angulated as at 266 in planes which are perpendicular to the plane of the portions 264 as will be better apparent from a comparison of FIGURES 27 and 28. Finally, the portions 266 at their lower ends are integrally connected by a horizontally extending cross member or bar 268. Rigidly secured to the stem 256 as by welding or the like is a surrounding disk 270 which constitutes a fingergrip means for the stationary component of the shackle.

The outer and movable component 254 of the shackle comprises a horizontal crossbar 272 which is welded or otherwise secured to the underside of a circular disk 274 which is complementary to the fingergrip 270 and constitutes a fingergrip portion for the movable component of the shackle. This disk has an aperture 276 therethrough which slidably embraces the stem 256 of the stationary component 252.

Depending from the opposite ends of the cross member 272 of the movable component 254 are the downturned and slightly angulated portions 278 from which depend parallel vertical portions 280.

The lower ends of the straight parallel portions 280 have angulated portions 282 which are joined at their lower ends by a crossbar 284. The crossbar 284 has secured thereto as by welding on the underside thereof the parallel angulated end portions 286 of a further crossbar 288 which is parallel to the bar 284. There is thus provided an opening or a slot between the two crossbars 284 and 288 in which is slidably received the lower portion of the stationary frame component 252.

Secured to the sides of the vertical portions 280 of the movable shackle component as by welding or the like are a pair of inwardly projecting members comprising locking jaws and which are indicated generally by the numeral 290. Each of the elements 290 comprises a substantially horizontal portion 292 and an upwardly outwardly inclined portion 294.

The arrangement is such that in this form of the shackle, the two fingergrip members 270 and 272 may be slightly moved toward each other a sufficient distance to cause the movable component 254 to lift the locking jaw 290 a sufficient distance from the stationary components to permit the passage of the legs of a chicken downwardly in the space between the portions 280 and 264. This space is wedge-shaped so that the weight of the fowl will serve to further wedge and retain the legs therein. The chicken, hung in this position, is then ready for butchering. When it is desired to disengage the chicken it is merely necessary to manually or otherwise lift or move the fingergrip portion 274 toward the fingergrip portion 270 thus elevating the movable component 254 relative to the stationary component, to the position shown in FIGURE 27, at which time ample space is provided between the stationary movable components to effect the release of the fowl therefrom by gravity.

Reference is next made to a modified embodiment of shackle shown in FIGURES 30–34 which is specifically adapted for use in supporting poultry for evisceration thereof. This form of shackle somewhat resembles that of the preceding embodiment of FIGURES 24–29 in that it consists of two relatively movable wire like components assembled together. This embodiment of the invention indicated generally by the numeral 300 likewise includes an inner relatively stationary component 302 and a relatively movable outer component 304. The stationary component includes a stem 306 consisting of a pair of parallel portions 308 which are integrally connected at their upper end as by a loop portion 310 which serves as a means for supporting the shackle. Fixedly secured to and embracing the loop portion 310 is a circular disk 312 which is welded or otherwise secured to the stem and constitutes a fingergrip means as set forth hereinafter.

Figure 32:
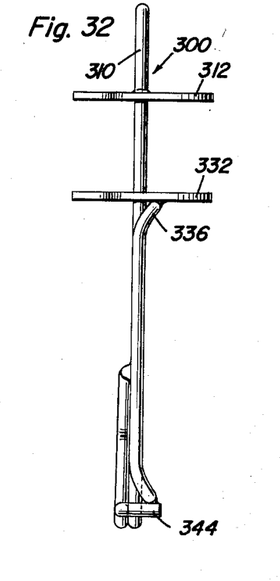
FIGURE 32 is an end elevational view of the shackle of FIGURE 30.
Figure 33:
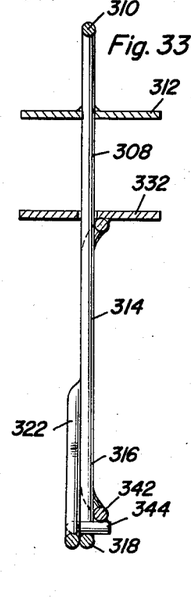
FIGURE 33 is a vertical longitudinal sectional view taken substantially upon the plane indicated by section line 33—33 of FIGURE 30.
Figure 34:
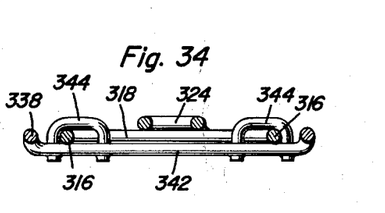
FIGURE 34 is a horizontal sectional view taken substantially upon the plane indicated by section line 34—34 of FIGURE 30.

In this form of the invention, the entire structure of the stationary component 302 lies in the same vertical plane as will be apparent from a consideration of FIGURES 32 and 33. At their lower ends the parallel portions 308 have downwardly and outwardly divergent portions 314 whose lower ends terminate in parallel portions 316 integrally joined by a cross member 318. A rod-like brace member 320 is welded or secured to the lower end of the stationary component 302, and consists of an upwardly divergent V-shaped lower member 322 whose lower end constitutes a loop 324 which is welded to the cross member 318, and its upper ends constitute divergent legs 326, each of which is welded to one portion 314. The V-shaped member 322 constitutes a means for receiving and retaining the neck or head of poultry therein.

The movable outer component 304 comprises a generally rectangular framework including a horizontal top member 330 secured to a circular disk 332 comprising a fingergrip member and which is apertured as at 334 to slidingly embrace the stem 306 of the stationary component for guided sliding movement thereon.

At its extremities, the cross member 330 has parallel vertically depending but slightly angulated portions 336 which as shown in FIGURES 32 and 33 compensate for the disposition of the member 330 to one side of the stem portion 306. Depending from the portions 336 are parallel vertically depending portions 338 which lie in the same vertical plane as that which contains the portions 308, 314 and 316 of the stationary component 302. At their lower ends, the portions 338 are again provided with angulated portions 340 of slightly greater extent and in the opposite direction from the portion 336 so that the integral transverse bar 342 carried thereby may slidably engage the other side of the stationary component 302. This relationship will be readily apparent from a consideration of FIGURES 32, 33 and 34 in conjunction with FIGURE 30. Secured to the crossbar 342 of the movable component 304 is a pair of U-shaped guide members 344 which embrace and slidingly and guidingly retain between themselves and the crossbar 342, the portions 316 of the stationary component 302. In addition, the legs of the U-shaped members 344 are adapted to abut upon the crossbar 318 of the stationary components and thus constitute a stop means limiting relative sliding movement of the movable component with respect to the stationary component.

Figure 30:
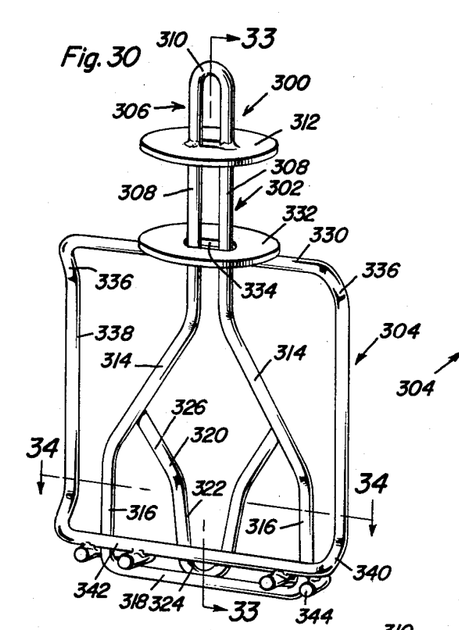
FIGURE 30 is a perspective view of yet another form of poultry shackle specifically intended to function as a shackle for supporting poultry during eviscerating operations thereon with a shackle being shown in its closed position for retaining poultry therein.
Figure 31:
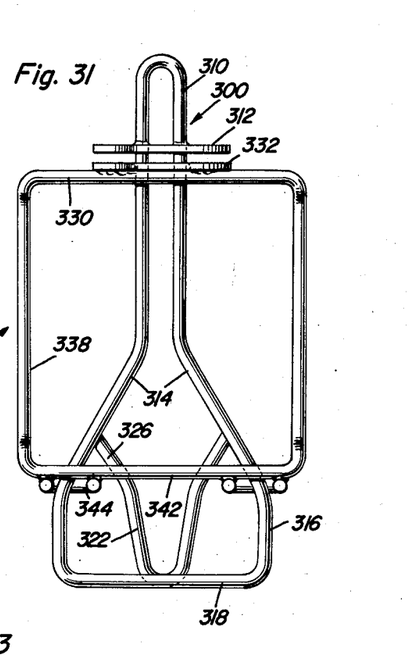
FIGURE 31 is a front elevational view of the shackle of FIGURE 30 and with the parts moved to the poultry releasing position of the shackle.

The operation of this form of shackle is as follows:

The two components of the shackle will normally be in the position shown in FIGURE 30 under the influence of gravity. At this time, the legs of the fowl may be thrust into the V-shaped or wedge-shaped opening lying between the portions 338 and 316, with the inclined portion 314 facilitating the guiding of the legs thereinto. The head of the fowl may likewise be disposed in the V-shaped member 322 so that the fowl may be hung by its head and legs in a substantially horizontal position. Alternatively, the head may be permitted to hang downwardly if desired and the fowl be supported solely by its legs.

When it is desired to release the fowl from the shackle, it is merely necessary to manually or by mechanical means cause movement of the fingergrip members 312 and 332 toward each other, thereby lifting the movable component 304. As will be noted, the lifting movement is effected by a complete guiding action between the components effected by the guiding opening 334 of the fingergrip member 332 on the stem 306 of the stationary component and by the sliding engagement of the U-shaped guide member 344 on the portions 316 of the stationary component.

Attention is next directed to the modified construction of shackle shown in FIGURES 35–40 and which is particularly adapted for use in supporting fowls for killing the same. This form of shackle likewise is of a rod-like construction and is indicated generally by the numeral 350. This form of the invention is likewise of rod-like configuration including a stationary component 352 and a movable component 354. The stationary component includes the supporting stem 356 having parallel portions or leg members 358 which are joined by a supporting loop 360 at their upper ends. Surrounding the stem adjacent the loop is a circular disk 362 which comprises a fingergrip portion.

At their lower ends, the leg portions 358 have downwardly and outwardly divergent portions 364 and terminate in outwardly divergent portions 366 which are integrally connected by a crossbar 368. All portions of the stationary component 352 lie in the same vertical plane as will be apparent from FIGURES 36 and 37.

A transverse bar 370 is connected through and extends between the portions 366 and serves to both brace and reinforce the portion of the stationary component and also to constitute a stop means for a movable jaw as set forth hereinafter.

A pair of pivoted levers each indicated generally by the numeral 372 is mounted upon the stationary component. The levers are bell-crank members having a central portion pivoted as at 374 to the stationary component at the junction of the portions 364 and 366 thereof. Each lever 372 includes a lever arm 376 and an actuating arm 378 which is angulated with respect to the arm 376. This actuating arm in turn has an end portion 380 which projects laterally therefrom and overlies the crossbar 370 in order to engage the same and thus limit pivoting movement of the lever in one direction.

The movable component of the shackle includes a circular disk 390 which is apertured as at 392 to slidably and guidingly embrace the stem 356. Secured to the underside of the fingergrip member 390 by welding or the like are the horizontal upper end portions 392 or a pair of parallel vertical members 394. This construction is shown best in FIGURE 39. At their lower ends it will be observed that the members 394 are pointed as at 396 and are guidingly received in the looped end portions 398 of a band or strap 400 which embraces the opposite sides of the stationary frame bottom cross member 368, as by being welded thereto. These loop portions constitute guides for the lower ends of the rods 394 of the movable component of the shackle.

Guide means are likewise provided for the upper ends of the rods 394. For this purpose there is provided and shown more clearly in FIGURE 38 a pair of cross rods having horizontal portions 402 having each at its end a downturned vertically extending portion 404. The midportions of the rods 402 are inwardly offset toward each other to provide mounting portions 406 which are welded or otherwise fixedly secured to the two legs 358 of the stem portion 356 of the stationary component. The downwardly projecting portions 404 are each provided with a pair of rings 410 and 412 which loosely embrace and thus slidably guide the upper portions of the rods 394. It will thus be seen that the guide rings 410 and 412 are rigidly attached to the elements 404, 402 and are attached therewith to the stationary component 352 by engagement of the portions 406.

Figure 35:
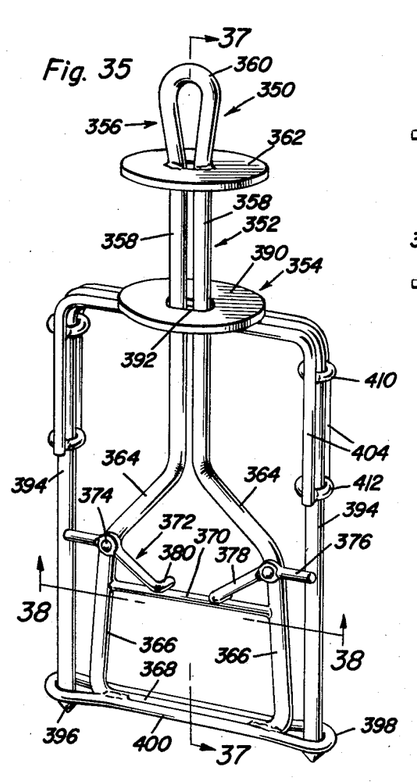
FIGURE 35 is a perspective view of still another modification of the shackle and shows a form of shackle which is specifically adapted for use in holding live poultry for killing the same.
Figure 36:
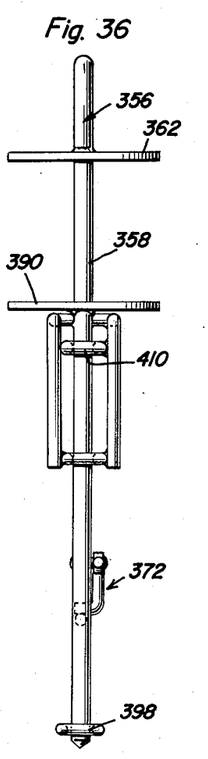
FIGURE 36 is an end elevational view of the shackle of FIGURE 35 as taken from the left end thereof.
Figure 37:
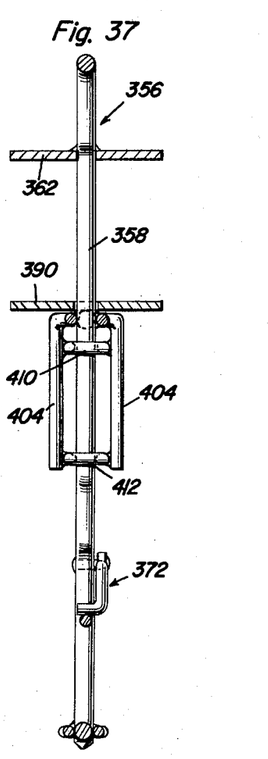
FIGURE 37 is a vertical central longitudinal sectional view taken substantially upon the plane indicated by section line 37—37 of FIGURE 35.

The operation of this form of shackle is as follows:

The effect of gravity will normally urge the movable component to its lowered position as shown in FIGURE 35. Likewise gravity will urge the levers 372 so that their terminal portions 380 will stop and bear against the cross member 370 with the arms 376 of the levers lying across the space between the members 366 and 394. This is the normal position of the device in readiness for use. When it is desired to insert the legs of the fowl into the wedge shaped spaces defined between the portions 366 and 394, it is merely necessary to press the legs down upon the arms 376 which in turn will appropriately pivot the levers 372 to permit such passage of the legs of the fowl therepast. Thereafter the weight of levers will cause the arms 376 to again move across the wedge shaped opening and block upward removal and release of the legs therefrom. As will be noted, the members 380 bearing upon the crossbar 370 will positively lock the levers against movement which will uncover the upper end of the wedge-shaped leg receiving spaces.

When it is desired to release the fowl from the shackle it is merely necessary to manually or mechanically move the fingergrip member 390 toward the fingergrip member 362. This relative upward sliding movement will lift the rods 394, causing them to slide in their guide rings 410 and 412 and disengage the lower ends of the rods from the guide loops 398. This in turn will release or uncover the lower ends of the wedge-shaped passages so that the legs will be readily removed therefrom.

Figures 38, 40:
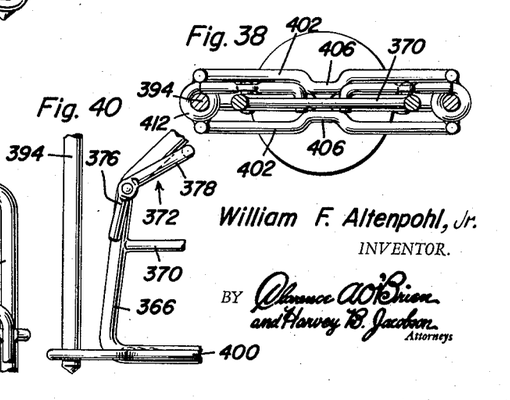
FIGURE 38 is a horizontal sectional view taken substantially upon the plane indicated by section line 38—38 of FIGURE 35.
FIGURE 40 is a detailed view in elevation of a portion of the left side of the shackle of FIGURE 35 but showing the poultry retaining pivot means in poultry releasing position therein.
Figure 39:
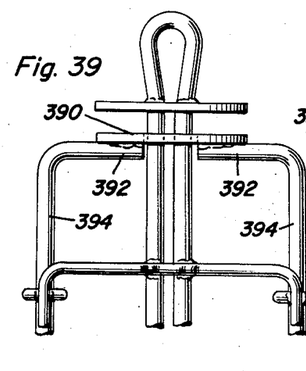
FIGURE 39 is a fragmentary elevational view of the upper portion of FIGURE 35 but showing the position of the parts when the shackle is moved into poultry releasing position.

FIGURE 39 indicates the raised position of the movable component with respect to the stationary component while FIGURE 40 indicates the pivoting movement of the levers 372 as the leg of a fowl is passed downwardly into the wedge-shaped leg receiving space between the lower ends of the two components.

Although the foregoing specification and accompanying drawings particularly disclose, describe and illustrate the specific adaptation and use of the various forms of shackles to support, position and convey poultry, it will be understood that the invention is also of utility as a means for supporting and conveying other articles in a similar manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An article carrier comprising a vertical support body, a support member pivotally mounted on said body for tilting about a horizontal axis, at least one U-shaped hook secured to said support member and directed upwardly and outwardly to one side of said horizontal axis with spaced upper ends, a latch means connected with said body and member for retaining said plate against tilting, means for releasing said latch means, a closure for said hook movably carried thereby, cam means on said body controlling movement of said closure and hook.

2. An article carrier comprising a vertical support body, a support member pivotally mounted on said body for tilting about a horizontal axis, U-shaped hooks secured to said support member on opposite sides of said axis and directed upwardly and outwardly therefrom and having open upper article receiving ends, a movable closure means for the open upper end of one of said hooks, actuating means for said closure means for effecting movement of said closure means to open and close the upper end of the last mentioned hook.

3. The combination of claim 2 including a latch means connected with said body and support member for retaining the latter against tilting and means to release said latch means.

4. The combination of claim 2 wherein said closure means comprises a lever, a fulcrum for said lever carried by said last mentioned hook, said actuating means comprising a cam carried by said body and engaging said lever.

5. A poultry shackle for use with an overhead conveyor system comprising a pair of connected, relatively stationary and movable components, pocket means associated with said components for receiving and supporting therein an extremity of a fowl and having an exit, releasable retaining means blocking egress from said exit, means responsive to predetermined movement of said movable component for releasing said retaining means thereby effecting the removal by gravity of a fowl extremity from said exit of said pocket means.

6. The combination of claim 5 wherein said retaining means is fixedly secured to and carried solely by said stationary component.

7. A poultry shackle for use with an overhead conveyor system comprising a pair of connected, relatively stationary and movable components, pocket means associated with said components for receiving and supporting therein an extremity of a fowl, movable releasable retaining means normally closing said pocket means and preventing escape of a fowl extremity therefrom, locking means securing said retaining means in pocket closing position and relatively movable with respect to said retaining means to release the latter from its closure of said pocket means and enable escape of a fowl extremity from the latter.

8. The combination of claim 7 wherein said locking means comprise arms pivoted for movement between a pocket restricting and pocket enlarging positions, said locking means being mounted upon said stationary component and being associated with said arms and responsive to relative movement between itself and one of said components for unlocking said arms.

9. The combination of claim 8 wherein each of said arms is pivoted intermediate its ends and has a pocket closing portion and a locking portion, each locking portion having a locking surface engageable by said locking means.

10. The combination of claim 9 wherein when said arms are in their pocket restricting positions their locking portions overlap and have opposed locking surfaces between which said locking means is received.

11. The combination of claim 10 wherein said locking means is slidably and guidingly mounted upon said support post and has oppositely disposed locking surfaces each abuttingly engaged with one of said locking portion locking surfaces.

12. A poultry shackle for use with an overhead conveyor system comprising a relatively stationary body component having a vertical support post, means pivotally mounted upon said body component and cooperating with the latter for releasably supporting an extremity of a fowl, a latch slidably and guidingly secured to said support post for vertical movement, said pivotally mounted means having a latch surface engageable by said latch for locking said pivotally mounted means in a poultry extremity retaining position, said pivotally mounted means being arranged for gravity actuated movement to a fowl extremity releasing position upon disengagement of said latch therefrom.

13. A poultry carrier for use with an overhead conveyor assembly of the type in which the carrier is movably and dependingly supported comprising a body having therethrough a vertically extending notch, a support member pivotally mounted upon said body in said notch for tilting about a horizontal axis, article supports mounted solely on said support member and projecting upwardly and outwardly therefrom on opposite sides of said horizontal axis, latch means cooperating with said body and said support member for preventing tilting of said support member.

14. An article carrier comprising a vertical support body having a bifurcated lower end, a support member pivotally mounted in said bifurcated lower end for gravity tilting about a horizontal axis, a hook secured to said support member laterally to one side of and above said horizontal axis and directed upwardly and outwardly relative to said horizontal axis and having spaced upper ends, a latch means releasably connecting said body and support member and retaining the latter against tilting and means for releasing said latch means.

15. The combination of claim 13 wherein said support member comprises a plate.

16. The combination of claim 14 wherein said support member comprises a plate.

17. The combination of claim 13 wherein said latch means comprises a latch element movably mounted upon said body for movement toward and from said support member, said support member having a latch keeper releasably engaged by said latch element.

18. The combination of claim 13 wherein said latch means includes a latch keeper upon said support member, a latch element slidably and guidably mounted upon said body and movable towards and from said latch keeper.

19. The combination of claim 7 wherein said relatively stationary component comprises a support post and members connected thereto and defining a pair of upwardly opening pockets disposed on opposite sides of said post and comprising said pocket means, said pockets having each a bottom wall with upwardly converging side walls having a fowl extremity inlet opening at their top, said relatively movable component comprising a pair of arms each pivoted upon said support post and disposed each in a pocket for swinging movement between said side walls between retaining position in downwardly convergent relation to one side wall for wedgingly retaining a fowl extremity therebetween and a releasing position in downwardly divergent relation to said one side wall for releasing a fowl extremity from therebetween.

20. The combination of claim 7 wherein each of said arms includes a guide means slidably engaging said stationary component.

References Cited in the file of this patent

UNITED STATES PATENTS

| | | |
|---|---|---|
| 2,435,706 | Barker | Feb. 10, 1948 |
| 2,990,573 | Pitts et al. | July 4, 1961 |
| 3,032,172 | Jensen | May 1, 1962 |
| 3,044,109 | Wayne | July 17, 1962 |